Jan. 20, 1925.

F. J. TRAINOR

SPRING HANGER

Filed Oct. 13, 1923

1,523,616

INVENTOR,
FELIX J. TRAINOR,
By Joseph A. Minturn
ATTORNEY.

Patented Jan. 20, 1925.

1,523,616

UNITED STATES PATENT OFFICE.

FELIX J. TRAINOR, OF NEWCASTLE, INDIANA, ASSIGNOR TO TRAINOR NATIONAL SPRING COMPANY, OF NEWCASTLE, INDIANA, A CORPORATION OF INDIANA.

SPRING HANGER.

Application filed October 13, 1923. Serial No. 668,274.

*To all whom it may concern:*

Be it known that I, FELIX J. TRAINOR, a citizen of the United States, residing at Newcastle, in the county of Henry and State of Indiana, have invented new and useful Improvements in a Spring Hanger, of which the following is a specification.

My invention relates to improvements in spring suspension in vehicles and the purpose of my invention is to replace a short stiff spring with a relatively longer and more flexible spring and to provide a spring hanger whereby such a longer spring may readily be secured to the axle of the vehicle without disturbance of parts attached to the axle or new machine work being required.

It has been found that certain automobiles have spring suspensions that do not sufficiently absorb the road shocks, principally on account of the individual springs of such suspensions being comparatively short and stiff. My invention makes it possible to replace such short springs by longer springs which are, on account of their increased length, without other conditions being changed, very much more flexible and consequently more able to absorb a greater percentage of the road shocks.

I make it possible to use such longer springs by my new spring hanger which I provide in pairs and bolt directly to the upper arms of the front axle steering knuckle yoke. These hangers are light, and so formed that the end thrust of the spring is taken by the axle yoke arm, and the vertical vehicle load on the spring is borne by the axle bed proper, all of which construction gives a neat appearing, readily assembled, durable, and highly desirable attachment.

I attain these and other objects as may hereinafter appear by the means as illustrated in the accompanying drawing, in which—

Figure 1:
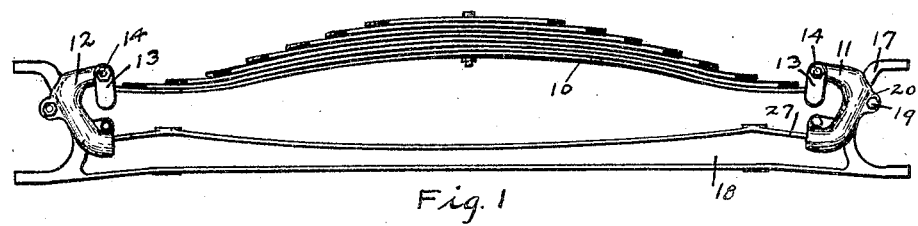
Figure 2:
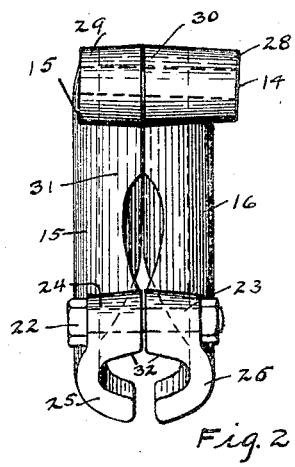
Figure 3:
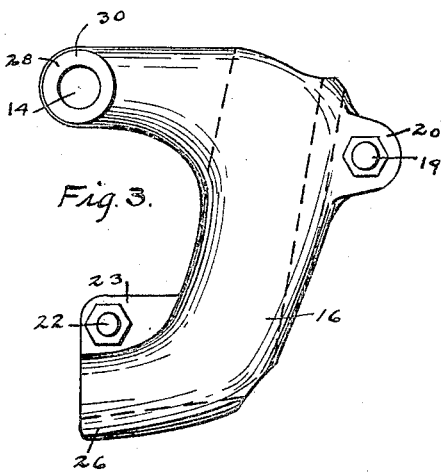

Figure 1 is a front elevation of a front automobile axle with my spring hanger attached thereto and supporting a transverse spring; Fig. 2 a side elevation of the left hand spring hanger (being on the left hand side of the axle as is customarily designated by referring to that side of the automobile as the left of the driver when seated in the car); Fig. 3, a front elevation of the left hand spring hanger; and Fig. 4, a top plan view of the same hanger.

Like characters of reference indicate like parts throughout the several views.

The vehicle spring 10 is suspended from the left spring hanger 11 and the right spring hanger 12 by the usual shackles 13, the bolts of which pass through the holes 14 of the hangers 11 and 12. The hanger 11 is formed of the back section 15, Figs. 2 and 4, and the front section 16, and is so cored out in its central portion as to fit, without machining the inner surfaces, closely around the yoke arm 17 of the axle bed 18, when the two sections of the hanger are clamped about the yoke arm and bolted together by the bolt 19 through the ears 20 and 21, and the bolt 22 through the ears 23 and 24.

Figure 4:
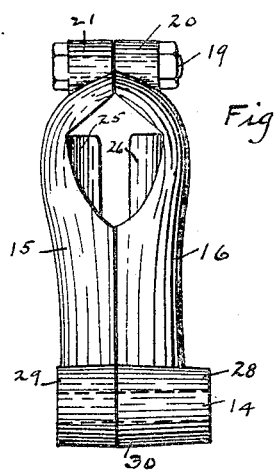

The spring hanger 11 has its lower ends of both the back section 15 and front section 16 formed with the jaws 25 and 26 to grip around the upper web 27 of the axle bed 18, so as to prevent upward displacement of the hanger. The hanger 11 has the boss 28 extending frontwardly, a greater distance from the line of division of the two sections, 15 and 16, than the boss 29 extends backwardly, as indicated in Figs. 2 and 4, this construction producing an offset shackle carrying head 30. The right hand hanger 12, is similar to the left hand hanger 11, but with the corresponding parts reversed.

The shackle head 30 is offset for the purpose of tilting the axle 18 backward to produce the desired and well known caster action of the front wheels of the vehicle (not shown).

My spring hanger 11, consists essentially of a central hollow body 31, having its outer surface approximately that of a cylinder, and an inner cavity conforming to the general contour of the axle yoke arm 17; the central body 31 having an outwardly projecting ear near its upper end; the inwardly projecting shackle head 30 at the upper end of the central body 31; and the inwardly projecting foot at the lower end of the body to form the rest 32 on the axle bed 18, with the further downwardly projecting jaws 25 and 26, and an ear on top of the projecting foot.

While I have described my invention in detail in the form now best known to me, it is obvious that variations may be made without departing from the spirit of my invention, and I therefore do not desire to be limited to the precise form as set forth to any degree greater than may be required by the following claims.

I claim as my invention;

1. In a vehicle, the combination with a transverse leaf spring and an axle having yoke ends, of a spring hanger sustantially C-shaped, having its central vertical portion so cored out as to permit said hanger to completely surround circumferentially and snugly the upper arm of the yoke of said axle, said hanger having a lower leg projecting inwardly along the axle cored out continuingly from the hollow section within the vertical portion of said hanger so as to permit the hanger to fit snugly on, around and under a substantial length of the upper flanges of said axle, said hanger having an inwardly projecting upper leg terminating in a head adapted to engage through shackle means with said spring, said hanger being divided into two vertical sections; and means of clamping the two sections rigidly about the axle.

2. In a vehicle, the combination with a transverse leaf spring and an axle having yoke ends, of a spring hanger substantially C-shaped, having its central vertical portion so cored out as to permit said hanger to completely surround circumferentially and snugly the upper arm of the yoke of said axle, said hanger having a lower leg projecting inwardly along the axle cored out continuingly from the hollow section within the vertical portion of said hanger so as to permit the hanger to fit snugly on, around and under a substantial length of the upper flanges of said axle, said hanger having an inwardly projecting upper leg terminating in a head adapted to engage through shackle means with said spring, said upper head being offset forwardly of the hanger to permit said axle being tilted backwardly with respect to said transverse spring, said hanger being divided into two vertical sections; ears projecting from each of said vertical sections; and bolts passing through said ears for the purpose of rigidly clamping said two vertical sections together on the said axle.

Signed at Newcastle, Indiana, this the 10 day of October, 1923.

FELIX J. TRAINOR.